July 2, 1929.  C. J. VAN AKEN  1,719,790
LAWN SPRINKLER
Filed July 22, 1927   4 Sheets-Sheet 2
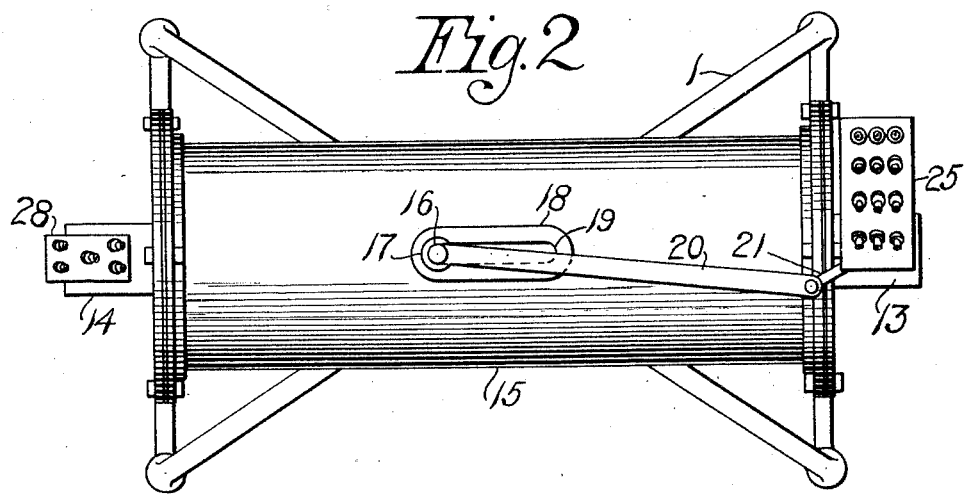
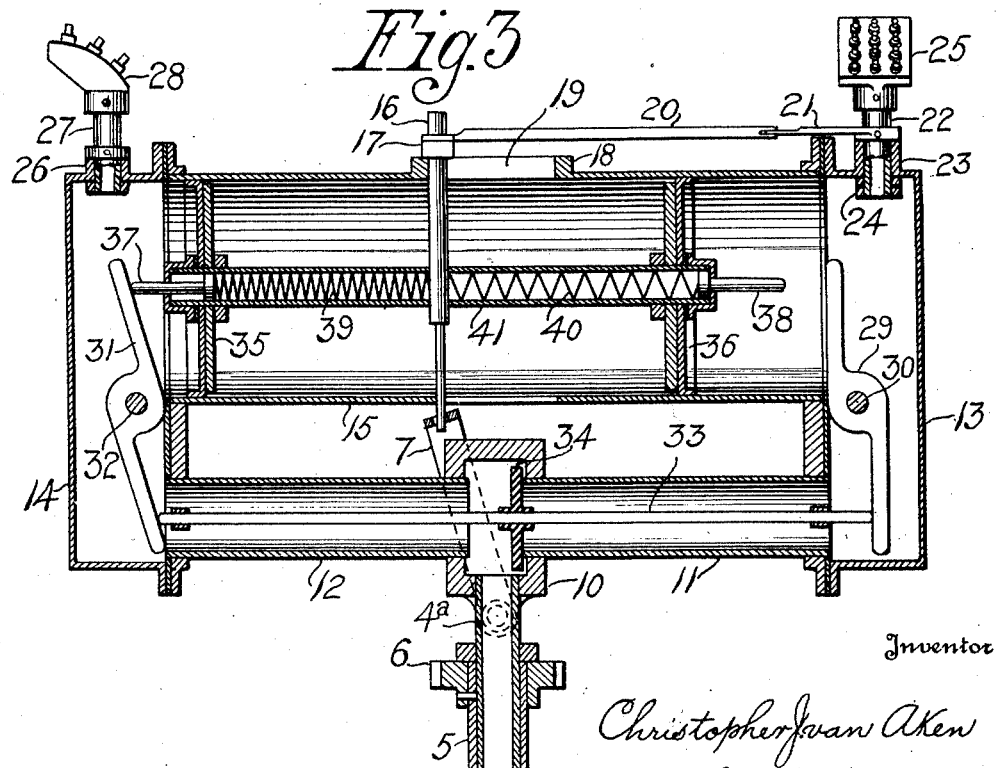

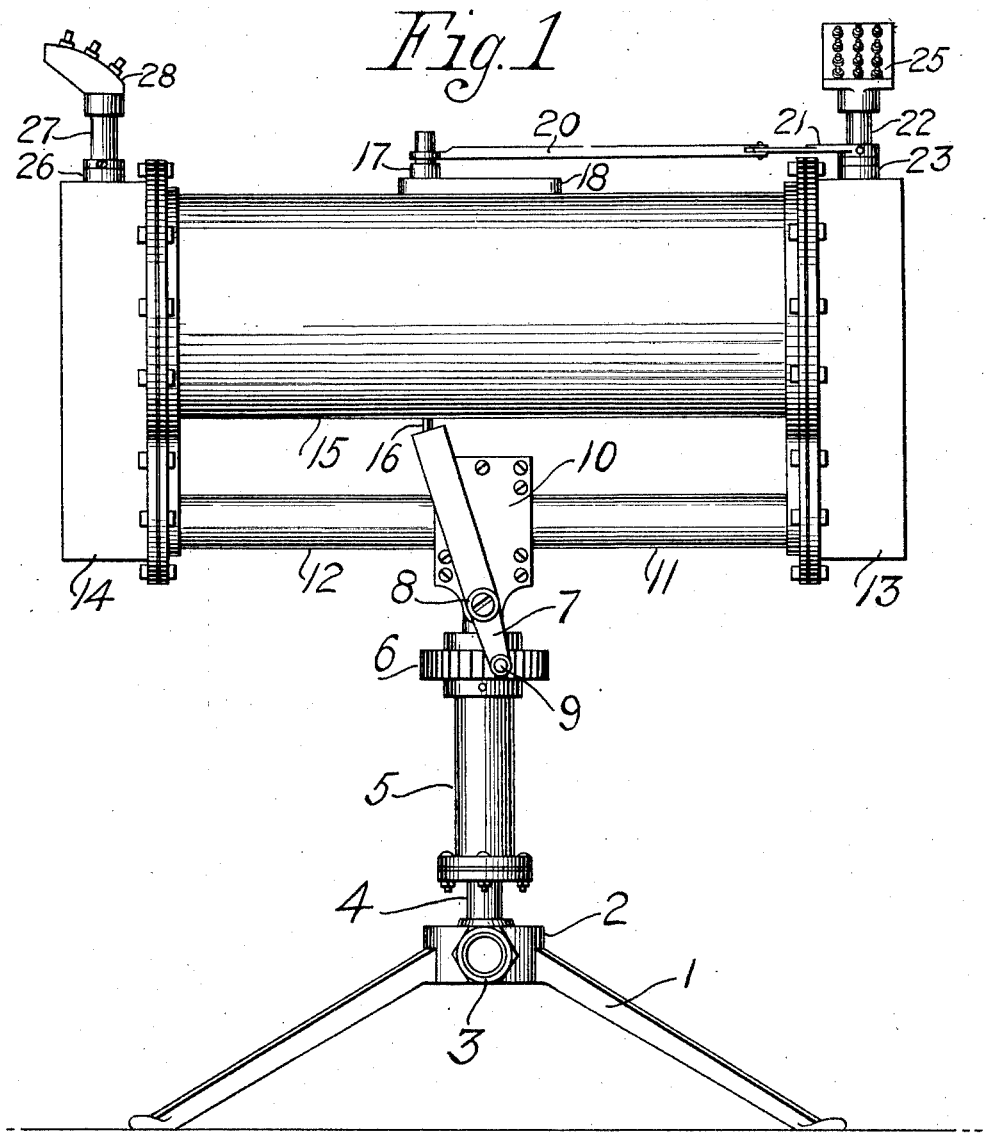

July 2, 1929.  C. J. VAN AKEN  1,719,790
LAWN SPRINKLER
Filed July 22, 1927   4 Sheets-Sheet 3
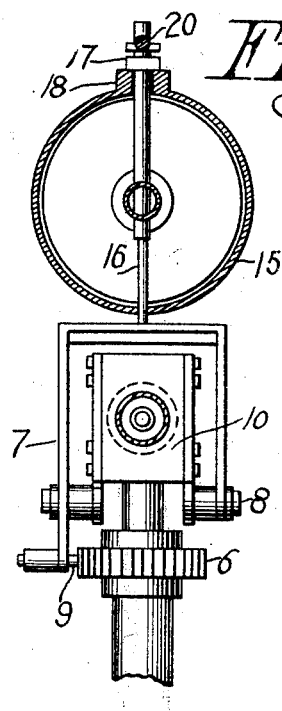
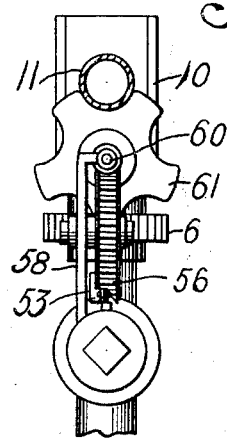
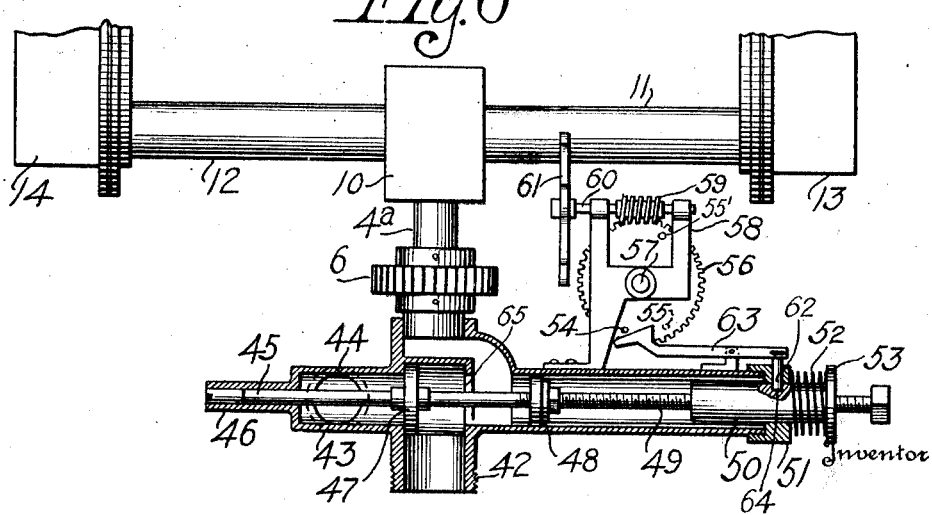

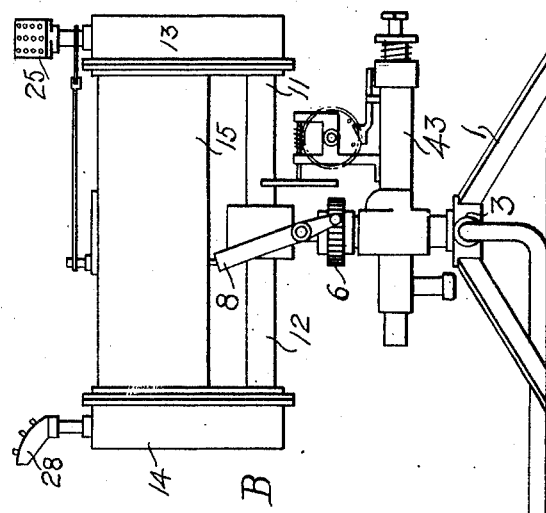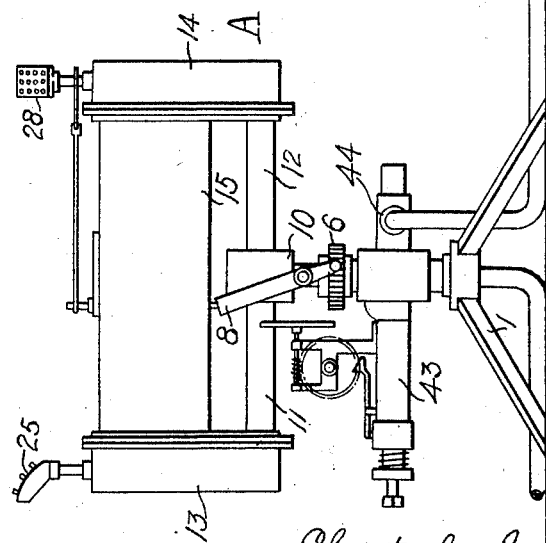

Patented July 2, 1929.

1,719,790

UNITED STATES PATENT OFFICE.

CHRISTOPHER J. VAN AKEN, OF WEST ORANGE, NEW JERSEY.

LAWN SPRINKLER.

Application filed July 22, 1927. Serial No. 207,695.

This invention relates to lawn sprinklers, and has for its object the production of apparatus for effectively spraying grass for a predetermined period of time, which may be made shorter or longer as desired, by means of the mechanism herein illustrated and described. It is a further object of this invention to apply sprinklers constructed in accordance with this disclosure to the watering of different portions of the lawn, the sprinklers being arranged in series in any chosen location and connected one with another by suitable pipes, each sprinkler being provided with mechanism for cutting off water from itself in a predetermined period of time and simultaneously admitting water to the next sprinkler of the series that will in its turn perform a corresponding operation.

In the accompanying drawings Fig. 1 represents a side view of all parts assembled, with the exception of the timing attachments. Fig. 2 is a top view of the parts shown in Fig. 1. Fig. 3 is a vertical section lengthwise of the body and valve cylinders. Fig. 4 is a vertical cross section of the cylinders showing the rotating mechanism. Fig. 5 is a vertical cross section of the valve cylinder showing the timing attachments. Fig. 6 is a side view of the valve cylinder, which is shown in longitudinal section, and illustrates the timing attachments. Fig. 7 represents a side view of two lawn sprinklers arranged in series with water pipe connecting them whereby when water is cut off from the first sprinkler by its regular operation, the water is admitted to the second sprinkler and so on.

Throughout the drawings and description the same number is employed to refer to the same part.

Considering Figs. 1, 2 and 3, a water serving stand 1 of any selected form, has a water chamber 2, a water inlet connection 3, and a vertical outlet pipe 4. The stand supports the operating members. Pipe 4 carries a cylinder 5 that is provided at the top with a ratchet wheel 6. A vibrating yoke 7, best shown in Fig. 4, is supported by pivot pins 8 and has a pin or lug 9 in engagement with the ratchet wheel 6. In Fig. 3 will be noted the vertical pipe 4ª aligned with the pipe 4 and bearing at its upper end the housing 10, from which project to right and left the complementary portions of the valve cylinder to be hereafter described. The portions of the valve cylinder communicate with the end chambers 13 and 14 of the sprinkler body cylinder 15.

As best shown in Fig. 3, an operating rod 16 extends vertically through the body 15 and has a head 17 that slides back and forth upon the rim 18 of a slot 19 in the top of the body formed for the sidewise passage of the operating rod 16. The head 17 bears the end of a connecting bar 20, the other end of which is pivotally joined to a crank arm 21. The butt of the crank arm is secured to a short vertical tube 22 that passes through the throat 23 into the end chamber 13, and is held in position by a nut 24. The tube 22 has a rocking movement on a vertical axis, and carries at the top the spray head 25, of any chosen shape size or fashion. The head, therefore is in communication with the body cylinder 15.

Still considering Fig. 3 it will be observed that the chamber 14 has a throat 26 in which a tube 27 is secured, and at the top of the tube is located the spray head 28. As this invenion is customarily made the head 28 is stationary with respect to the body 15, but it is held to be within the purview of this invention to rock the head 28 also if desired.

Further considering Fig. 3, there will be noted in chamber 13 a lever 29 having a fulcrum or pivot 30, and in the opposite chamber 14 there is a like lever 31 with a pivot 32. In the valve cylinder formed by the portions 11 and 12 is a valve rod 33 working axially in the cylinder and having a valve 34. The lower ends of the levers 29 and 31 are normally in movable contact with opposite ends of the valve rod 33. The upper ends of the levers in their movements encounter the push rods 37 and 38 located centrally with respect to the pistons 35 and 36 in the body cylinder 15, and arranged to be moved against the force of springs 39 and 40 occupying a tube 41 which has its ends secured centrally in the pistons 35 and 36.

Considering Figs. 5 and 6, it will be seen that the water inlet 42 forms a part of a modified valve tube or cylinder 43, which has a water outlet 44. A valve rod 45 is guided in the sleeve end 46 of the cylinder 43, and carries the valve 47. The disk 48 in the cylinder 43 further centers the valve rod. One end portion of the valve rod marked 49 is threaded and near its end is a cylindrical plug 50 movable outwardly and inwardly through the head 51 of the cylinder. Encircling the plug is a coil spring 52 acting between the head 51 and the flanged end 53 of the plug.

Further considering Fig. 6, there will be noted a small pin 54 adapted to be inserted into sockets 55 or 55' in a worm wheel 56 having the shaft 57 borne by the cylinder 43 in a suitable frame as shown. The frame is designated by number 58 and carries a worm shaft 59 in engagement with the worm wheel 56. An extended portion 60 of the worm shaft beyond the frame bearings 58 carries the star wheel 61 arranged in the path of the valve cylinder portion 11 as the same rotates in a horizontal plane and in intermittent engagement with the portion 11.

In Fig. 6 it will be noted that the cylindrical plug 50 on the threaded end portion 49 of valve rod 45 is releasably held by the pin 62 at the outer end of the rocking lever 63 and in engagement with the slot 64 in the plug. These elements will be again mentioned in the explanation of the action as follows:—

In operation, considering Figs. 1, 2 and 3, water may flow into chamber 14 as the parts are shown. Pressure on piston 35 through push rod 37 moves tube 41 to the right against the force of the springs and push rod 38 moves lever 29 transferring the valve 34 from its seat on the inner end of the cylinder portion 11 to the corresponding end of the portion 12. Meanwhile spray head 28 is discharging. When valve 34 closes cylinder portion 12, chamber 13 fills and rocking spray head 25 discharges, until the pressure on the right of piston 36 reverses the operation. As the tube 40 moves the operating rod 16 extending through the cylinder 15 moves with the tube, and by its connection with bar 20 and crank 21 rocks the head 25 as will be understood. The lower end of the rod 16 engages the yoke 7 which rocks on its pivots 8 and exerts a force by its pin 9 on the ratchet wheel 6. The wheel is fixed, and the effect is to turn the body cylinder in a horizontal plane, the chamber 13 moving from the observer, as the parts are illustrated in Fig. 1. The sidewise movements of the operating rod 16 consequently rotates the body step by step.

Considering Fig. 6, let it be assumed that water is flowing upwardly through vertical pipe 4ª into housing 10, and the resulting operation of the parts explained is to move chamber 13 from the observer. Worm wheel 56 will be turned intermittently contrary to the movement of the hands of a watch, and pin 54 will force down the inclined end portion of the lever 63, drawing the lever pin 62 from the plug slot 64 and releasing the plug 50. The coil spring 52 will move the valve rod 45 and transfer valve 47 to the opposite seat 65. Water is now shut off from the housing 10, and is directed through outlet 44 to the next sprinkler. The flow of water through outlet 44 will continue until plug 50 is pressed inwardly by hand and the latch pin 62 again engaged. Let it be assumed that the parts are so arranged that the pin 54 in the worm wheel 56 is placed in socket 55. Under those conditions the wheel 56 must make a complete revolution before the pin can again operate the lever 63. But, if the parts are so arranged that the pin 54 is inserted in the socket 55', then the worm wheel need turn but one-half way around to actuate the lever 63 and shut off the water. By suitably locating the pin sockets the periods of time during which the sprinkler is in operation may be varied as described.

Considering Fig. 7, the sprinklers A and B have the structure described, and the pipe C leads from the outlet 44 of the sprinkler A to the inlet 3 of sprinkler B. After water is cut off from sprinkler A the sprinkler B will operate, and any number of sprinklers may be arranged in series in any location. It is thought to be obvious that the outlet 44 of the last of the series must be plugged to finally stop the flow of the water.

From the foregoing it is believed to be made clear that the sprinkler body may be rotated and the spray heads served alternately, one or both or any number of heads being rocked. Further each sprinkler may be caused to operate during a predetermined period of time, either alone or in series as stated.

It is not intended to limit this invention specifically to the shape or size of any mechanical part set out herein, as this applicant is fully aware that numerous changes in construction can be readily devised having the same function and equivalent in operation.

Having now described this invention and explained the manner of its use, what I claim is:—

1. In a lawn sprinkler, the combination with a cylinder arranged with its axis horizontal, the said cylinder having pistons therein connected and movable together, the said cylinder having water chambers and spray heads at the ends, levers pivotally mounted in said chambers, the said pistons having devices for moving the levers by contact alternately, a two part cylinder having in its axis parallel with the axis of the first cylinder and constituting a valve cylinder, the said parts of the valve cylinder opening into the said water chambers, a guided rod in the valve cylinder, a valve on the rod movable by the said levers to close alternately the two parts of the valve cylinder, a housing for the valve connecting the parts of the valve cylinder, and means for conducting water to the housing.

2. In a lawn sprinkler, the combination with a cylinder arranged with its axis horizontal, the said cylinder having pistons therein connected and movable together, the said cylinder having water chambers and spray heads at the ends, levers pivotally mounted in said chambers, the said pistons having devices for moving the levers by contact alternately, a two part valve cylinder arranged adjacent to the first cylinder, the said parts of the valve cylinder opening into the said water chambers, a guided valve rod in the valve cylinder, a valve on the rod movable by the said levers to close alternately the two parts of the valve cylinder, a housing for the valve connecting the two parts of the valve cylinder, means for conducting water to the housing, and means actuated by the movements of the pistons for rotating the cylinders horizontally.

3. In a lawn sprinkler, the combination with a cylinder arranged with its axis horizontal, the said cylinder having pistons therein connected and movable together, the said cylinder having water chambers at the ends provided with spray heads, levers pivotally mounted in the said chambers, the said pistons having devices for moving the levers by contact alternately, a two part valve cylinder located adjacent to the first cylinder, the said parts of the valve cylinder opening into the said water chambers, a guided valve rod in the valve cylinder, a valve on the rod movable by said levers to close alternately the two parts of the valve cylinder, a housing for the valve connecting the two parts of the valve cylinder, means for conducting water to the housing, means for rotating the cylinders horizontally, one of the spray heads having a rocking movement and a connecting bar, and an operating bar connected with the said pistons and movable therewith, the said bar being constructed and arranged to operate the said connecting bar of the spray head and the said means for rotating the cylinder.

4. In a lawn sprinkler, the combination with a cylinder arranged with its axis horizontal, the said cylinder having pistons therein connected and movable together, the said cylinder having water chambers at the ends provided with spray heads, levers pivotally mounted in the said chambers, the said pistons having devices for moving the levers by contact alternately, a two part valve cylinder having its axis parallel with the axis of the first cylinder, the said parts of the valve cylinder opening into the said water chambers, a valve rod and valve on the rod movable to close alternately the two parts of the valve cylinder, a housing for the valve connecting the said parts of the valve cylinder, means for conducting water to the said housing, means for revolving the cylinders horizontally comprising a fixed ratchet wheel and a vibratory yoke engaging the said wheel, and an operating bar extending into the first cylinder and connected with the said pistons and arranged to actuate the said vibratory yoke.

5. In a lawn sprinkler, the combination with a revoluble member, of means for revolving the member, means for serving water to the said member and controlling the same comprising a spring operated valve movable in one direction to shut off water from the said member, a latch device adapted to hold the said valve in its open position admitting water to the member, a worm and worm wheel, a star wheel arranged in the path of the said member and intermittently rotated thereby, the said worm and worm wheel being arranged to reduce the speed of revolution of the star wheel, and means carried by the worm wheel for releasing the latch to close the valve after a predetermined number of revolutions of the said member.

6. In a lawn sprinkler, the combination with a revoluble member, of means for revolving the member, means for serving and controlling water to the said member and having an outlet and a spring operated valve movable in one direction to shut off the water from the said member while admitting water to the said outlet, a latch device adapted to hold the said valve in its open position admitting water to the said member, and means actuated by the revolution of the said member for releasing the latch after a predetermined number of revolutions of the said member.

7. In a lawn sprinkler, the combination with a revoluble member, of means for revolving the member, means for serving and controlling water to the said member and having an outlet passage and a spring operated valve movable in one direction to shut off water from the said member and to open the outlet passage normally closed by the valve, a latch device adapted to hold the said valve in its open position admitting water to said member, and means actuated by the revolution of the said member for releasing the valve to shut off the member and open the outlet passage after a predetermined number of revolutions of the said member.

In testimony whereof I affix my signature.

CHRISTOPHER J. van AKEN.